United States Patent
Hussain et al.

(10) Patent No.: US 9,629,055 B2
(45) Date of Patent: Apr. 18, 2017

(54) SYSTEM AND METHOD FOR UNINTERRUPTED COMMUNICATION ACROSS BLACK SPOTS FOR MULTI INTERFACE MOBILE NODES

(71) Applicant: COMSATS Institute of Information Technology, Islamabad (PK)

(72) Inventors: Syed Mohammad Riaz Hussain, Islamabad (PK); Shahzad Ali Malik, Islamabad (PK); Hassan Ahmed, Islamabad (PK); Shahid Ahmed Khan, Islamabad (PK)

(73) Assignee: Comsats Institute of Information Technology, Islamabad (PK)

( * ) Notice: Subject to any disclaimer, the term of this patent is extended or adjusted under 35 U.S.C. 154(b) by 93 days.

(21) Appl. No.: 14/536,650

(22) Filed: Nov. 9, 2014

(65) Prior Publication Data

US 2016/0135105 A1     May 12, 2016

(51) Int. Cl.
*H04W 4/00* (2009.01)
*H04W 36/32* (2009.01)
*H04W 36/14* (2009.01)
*H04W 88/06* (2009.01)
*H04W 60/00* (2009.01)

(52) U.S. Cl.
CPC ............ *H04W 36/32* (2013.01); *H04W 36/14* (2013.01); *H04W 60/00* (2013.01); *H04W 88/06* (2013.01)

(58) Field of Classification Search
CPC .............................. H04W 36/32; H04W 88/06
USPC ............... 370/252–315, 328–336, 401–432; 455/332–437
See application file for complete search history.

(56) References Cited

U.S. PATENT DOCUMENTS

| | | | |
|---|---|---|---|
| 6,567,670 B1 * | 5/2003 | Petersson | H04W 36/0083 370/331 |
| 6,615,044 B2 * | 9/2003 | Artamo | H04W 36/0088 370/331 |
| 6,868,270 B2 * | 3/2005 | Dent | H04B 7/18545 455/435.1 |
| 7,983,667 B2 | 7/2011 | Hart et al. | |
| 8,023,948 B2 | 9/2011 | Han | |
| 8,243,689 B2 * | 8/2012 | Youn | H04W 36/30 370/331 |
| 8,243,691 B2 * | 8/2012 | Yamazaki | H04B 7/0617 370/334 |
| 8,254,331 B2 * | 8/2012 | Vargantwar | H04W 36/385 370/331 |
| 8,493,929 B2 * | 7/2013 | Park | H04W 8/20 370/331 |
| 9,107,114 B2 * | 8/2015 | Zdarsky | H04W 36/0033 |
| 2007/0191013 A1 * | 8/2007 | Gunnarsson | H04W 36/04 455/438 |

(Continued)

*Primary Examiner* — Man Phan

(57) ABSTRACT

A system and method for protection against loss of communication of a mobile node crossing a black spot region is disclosed. The system to prevent loss of communication with the mobile node consists of a mobile node, RF coverage map generator, black spot predictor, and a vertical handover process. The mobile node can experience uninterrupted communication across black spots. This is achieved by executing vertical handover before entering a black spot region, which is anticipated by using RF coverage maps and mobility pattern of the mobile node.

19 Claims, 5 Drawing Sheets

(56) References Cited

U.S. PATENT DOCUMENTS

2009/0298502 A1\* 12/2009 Hagerman ............ H04W 36/30
   455/436
2012/0154179 A1   6/2012 Burns et al.
2013/0072196 A1\* 3/2013 Jung ..................... H04W 36/30
   455/437
2014/0378144 A1\* 12/2014 Legg ..................... H04W 36/30
   455/437

\* cited by examiner (a)

(b)

SYSTEM AND METHOD FOR UNINTERRUPTED COMMUNICATION ACROSS BLACK SPOTS FOR MULTI INTERFACE MOBILE NODES

BACKGROUND

Field

Exemplary embodiments of the disclosed subject matter relate to a system and method for protecting a multi-interface mobile node against loss of communication due to a black spot region.

Discussion

Co-existing diverse access networks and mobile nodes (MN) having diverse layer-2 interfaces and the support of vertical handover (VHO) can help achieve ubiquity, an improved quality of signal (QoS), and better connectivity for a MN. Service providers can also better manage congestion across diverse networks, thereby creating a win-win situation for service providers and mobile users. VHO allows a multi-interface MN to transfer a live call or session from one access network to another.

VHO has further supported real-time and life critical applications for mobile users moving across heterogeneous networks. Life critical applications, such as remote monitoring of a patient in a mobile ambulance, may rely on uninterrupted communications. If uninterrupted communications cannot be provided, at least an upcoming communication discontinuity should be determined in advance so that precautionary measures can be taken.

Black spot regions (also referred to as dead regions) often arise in wireless communication networks within a coverage area of a point of attachment (PoA) when a signal level of a received signal at a MN suddenly falls below a receiver's sensitivity level, for example, due to a shadowing effect. The MN may then lose data packets, a call, or a communication session due to a discontinuity in the wireless communication.

When a signal is suddenly lost due to a black spot, a VHO-enabled MN may not have enough time to shift its call/session to a different network resulting in a loss in communication. Accordingly, a system and/or MN that can predict an approaching black spot is needed.

The above information disclosed in this Background section is provided to enhance understanding of the background of the disclosed subject matter and therefore may contain information that does not form any part of the prior art nor what the prior art may suggest to a person of ordinary skill in the art.

SUMMARY

Exemplary embodiments of the present disclosure disclose a system and method for protecting a mobile node against communication loss due to black spots by predicting an approaching black spot and executing vertical handover to an available network.

Additional features of the present disclosure will be set forth in the description which follows, and in part will be apparent from the description, or may be learned by practice of the disclosed subject matter.

Exemplary embodiments of the present disclosure disclose a system. The system includes a processor to provide, based on network environment information, a radio frequency (RF) map including information on signal strength within a region of a first point of attachment for a first network, to predict a black spot region for a first communication node connected to the first point of attachment for the first network, and to control a handover of a communication session of the first communication node from the first network to a second network based on the predicted black spot region. The communication session is between the first communication node and a second node, and the communication session of the first communication node is handed over from the first network to the second network while maintaining the communication session between the first communication node and the second communication node.

Exemplary embodiments of the present disclosure also disclose a method. The method includes providing, based on network environment information, a radio frequency (RF) map including information on signal strength within a region of a first point of attachment for a first network. The method further includes predicting a black spot region for a first communication node connected to the first point of attachment for the first network, and performing a handover of a communication session of the first communication node from the first network to a second network based on the predicted black spot region. The communication session is between the first communication node and a second node, and the communication session of the first communication node is handed over from the first network to the second network while maintaining the communication session between the first communication node and the second communication node.

Exemplary embodiments of the present disclosure also disclose one or more non-transitory computer-readable storage media having stored thereon a computer program that, when executed by one or more processors, causes the one or more processors to perform acts providing, based on network environment information, a radio frequency (RF) map including information on signal strength within a region of a first point of attachment for a first network. The acts further include predicting a black spot region for a first communication node connected to the first point of attachment for the first network, and performing a handover of a communication session of the first communication node from the first network to a second network based on the predicted black spot region. The communication session is between the first communication node and a second node, and the communication session of the first communication node is handed over from the first network to the second network while maintaining the communication session between the first communication node and the second communication node.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
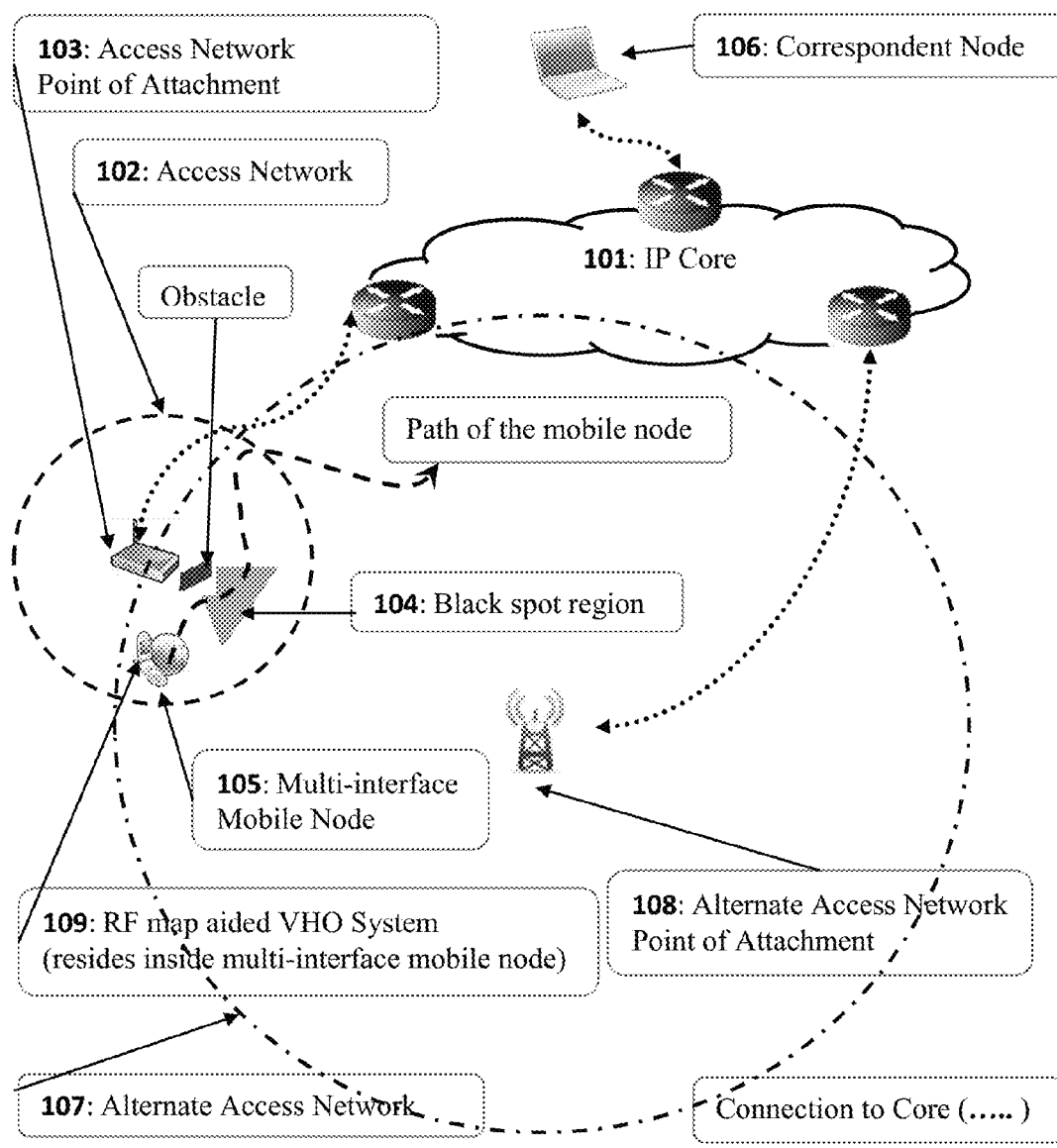
FIG. 1 is a diagram illustrating a network environment in which a mobile node encounters a black spot and can avoid communication discontinuity using Radio Frequency (RF) map-aided VHO, according to exemplary embodiments of the present disclosure.

The disclosed subject matter is described more fully hereinafter with reference to the accompanying drawings, in which embodiments of the disclosed subject matter are shown. This disclosed subject matter may, however, be embodied in many different forms and should not be construed as limited to the embodiments set forth herein. Rather, these embodiments are provided so that this disclosure is thorough, and will fully convey the scope of the disclosed subject matter to those skilled in the art. In the drawings, the size and relative sizes of layers and regions may be exaggerated for clarity. Like reference numerals in the drawings denote like elements.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" may include any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

Mobile node and multi-interface mobile node may be used interchangeably, referring to the user terminal device for mobile communication, in the present disclosure.

Hereinafter, exemplary embodiments of the present disclosure will be described in detail with reference to the accompanying drawings.

FIG. 1 is a diagram illustrating a network environment in which a mobile node (MN) encounters a black spot region and avoids discontinuity of service by using a RF map-aided VHO, according to exemplary embodiments of the present disclosure.

FIG. 1 shows a core network 101, an access network 102, a point of attachment 103 for the access network 102, a black spot region 104, a multi-interface mobile node 105, a correspondent node 106, an alternate access network 107, a point of attachment 108 of the alternate access network 107, and an RF map-aided VHO system 109 for keeping communication intact while crossing a black spot region in a network.

Core Network 101

Core network 101 may refer to a system through which diverse layer-2 access networks are connected. Examples of diverse layer-2 access networks include Wireless Local Area Network (WLAN) (e.g. WiFi, IEEE 802.11a/b/g/n), Wireless Metropolitan Area Network (WMAN) (e.g. WiMAX, IEEE 802.16), 2G cellular networks (e.g. EDGE), 3G cellular networks (e.g. HSPA) and 4G cellular networks (e.g. LTE). In FIG. 1, core network 101 may be an Internet Protocol (IP) core network. However, it should be understood that various suitable networks through which diverse layer-2 access networks are interconnected and are reachable to each other may be used as the core network 101.

Multi-interface mobile node 105 and correspondent node 106 can locate, approach, and communicate with each other through core network 101. Each of the multi-interface mobile node 105 and the correspondent node 106 may be any suitable electronic device capable of connecting to one or more wireless networks. For example, each of the multi-interface mobile node 105 and the correspondent node 106 may include, but is not limited to, a mobile phone, a smart phone, a personal digital assistant, a personal computer, a laptop, an electronic pad, a smart television, or a vehicle equipped with a navigation system, satellite communication system, or smart phone system.

Access Network 102

Access network 102 may be an access network which is selected over other access networks for providing better network connectivity to the multi-interface mobile node 105 in a heterogeneous network environment. This selection may be made due to various reasons, and is not limited to better network connectivity.

Access network 102 may have a point of attachment 103, and may provide connectivity to any MN within a coverage area or boundary of the access network 102. The access network 102 may include any suitable layer-2 access network, including but not limited to, WiFi (IEEE 802.11 a, b, g, n or any other variant), WiGig, WiMAX, GSM/EDGE, UMTS, LTE, CDMA, and/or a satellite network. In FIG. 1, the access network 102 may be a WiFi network. However, for a multi-interface mobile node 105, any available access network can be the access network 102. The selection of the access network 102 for multi-interface mobile node 105 may be due to reasons, such as access cost, access rate, quality, coverage, and/or security, or any other reason.

Point of Attachment 103 of the Access Network 102

The point of attachment 103 of the access network 102 is connected to the core network 101. Point of attachment 103 may provide the multi-interface mobile node 105 with a connection to the access network 102. The multi-interface mobile node 105 may therefore be connected to the core network 101 and the correspondent node 106 through the point of attachment 103. The point of attachment 103 may be a wireless switch, hub or a router. The method, mechanism or means of accessing, authentication, authorization, connectivity and communication between the point of attachment 103 and multi-interface mobile node 105 would be according to the standards of the access network technology.

The point of attachment 103 may have a finite coverage range, and within the coverage region, the received signal strength at the multi-interface mobile node 105 may vary due to various reasons, such as attenuation, noise, interference, and/or fading effects or any other reason.

Black Spot Region 104

In wireless communications, a black spot region may be present where a signal strength of a signal transmitted from a point of attachment in a network falls below a receiver's sensitivity level, which is configured based on specifications set forth by a manufacturer of the receiver in a MN. In these black spot regions, the multi-interface mobile node 105 may not be able to connect to the point of attachment 103, even within the coverage boundary of the access network 102. This may result in interruption, discontinuity, loss of communication, or a call drop. FIG. 1 shows a black spot region 104 present in the access network 102. The black spot region 104, which includes a black spot with respect to one access network, may have coverage from one or more alternate access networks in a heterogeneous network environment. In FIG. 1, the black spot region 104 may provide no connectivity to the point of attachment 103 of the access network 102, while an alternate access network 107 may be within range and connectable to the multi-interface mobile node 105. In some cases, the black spot region 104 may be a region wherein a first receiver signal strength associated with the point of attachment 103 is lower than a signal strength threshold and a second receiver signal strength associated with the point of attachment 108 is greater than the signal strength threshold. The access network 102 may have one or more black spot regions 104. The black spot region 104 may be created due to various reasons, such as, for example, signal attenuation, interference, noise, or cancellation. In some cases, the black spot region 104 may be created by an obstacle in the access network 102, as shown in FIG. 1. This obstacle may be a building, a moving object, or a terrain blocking a wireless signal between the multi-interface mobile node 105 and the point of attachment 103.

When the multi-interface mobile node 105 is present at a location of the black spot region 104 region, communication of the multi-interface mobile node 105 with access network 102 is interrupted. If the call is not handed over to a different network prior to entering the black spot region 104, the multi-interface mobile node 105 may lose an on-going communication session with a correspondent node 106.

Multi-Interface Mobile Node 105

The multi-interface mobile node 105 may be a user terminal device, which has the capability to connect with multiple and/or diverse access networks. This may be by virtue of availability of multiple layer 2 interfaces or availability of reconfigurable layer 2 interface(s) or any other arrangement.

Correspondent Node 106

The correspondent node 106 may be a network node connected to the core network 101. In some cases, the correspondent node 106 may be a user terminal device or any suitable electronic device as noted above.

Correspondent node 106 can locate, approach, and communicate with the multi-interface mobile node 105 through core network 101. The correspondent node 106 may, in some cases, be mobile, and, in some cases, may be static (e.g., position of node does not change).

Alternate Access Network 107

The alternate access network 107 may refer to an alternative network (with respect to access network 102) through which the multi-interface mobile node 105 may connect and access the core network 101 in the black spot region 104. The alternate access network 107 may include any suitable layer-2 access network, including but not limited to, WiFi (IEEE 802.11 a, b, g, n or any other variant), WiGig, WiMAX, GSM/EDGE, UMTS, LTE, CDMA, and/or a satellite network.

Point of Attachment 108 of Alternate Access Network 107

The point of attachment 108 may provide the mobile node 105 with access to the alternate access network 108 and the core network 101 when the multi-interface mobile node 105 connects to the alternate access network 107 via the point of attachment 108. The point of attachment 108 may have a finite coverage range, and within the coverage region, the received signal strength at the multi-interface mobile node 105 may vary due to various reasons, such as attenuation, noise, interference, and fading effects. The point of attachment 108 may be a wireless switch, hub or a router. The method, mechanism or means of accessing, authentication, authorization, connectivity and communication between the point of attachment 108 and mobile node 105 would be according to the standards of the access network technology.

RF Map-Aided VHO System 109

RF map-aided VHO system 109 may provide information for maintaining communication between the multi-interface mobile node 105 and the correspondent node 106 while the multi-interface mobile node 105 crosses the black spot region 104 in the access network 102. While FIG. 1 illustrates the VHO system 109 as being configured and implemented in the multi-interface mobile node 105, the VHO system 109 is not limited thereto, and may be implemented in various suitable locations, such as remote servers connected to the multi-interface mobile node 105.

The RF map-aided VHO system 109 may include a RF Map Generator 205 and a Black Spot Predictor 210. It should be understood that the RF map-aided VHO system 109 may include various suitable components such as one or more of a non-transitory computer-readable storage media, a memory, and a processor. For example, the VHO system 109 may include input device(s), output device(s), processor(s), memory system(s), and storage unit(s), all or some of which are coupled, directly or indirectly, via an interconnection mechanism, which may be comprised of one or more buses, switches, and/or networks. The output device(s) may display or transmit information to a user or machine (e.g., a liquid crystal display). The processor(s) may execute a computer program (e.g., an operating system), which controls execution of the method implemented by the VHO system 109 (as explained with reference to FIG. 2), and other computer programs, and provides scheduling, input/output control, accounting, compilation, storage assignment, data management, memory management, communication, and data flow control. For instance, in some cases, the processor(s) may include the RF Map Generator 205 and the Black Spot Predictor 210, and may execute the operations configured to be performed by the RF Map Generator 205 and the Black Spot Predictor 210. The computer programs executed by the processor(s) may be written in any type of computer programming language, including a procedural programming language, object-oriented programming language, macro language, or combination thereof. These computer programs may be stored in a storage system, which may hold information on a volatile or non-volatile medium, and may be fixed or removable.

Figure 2:
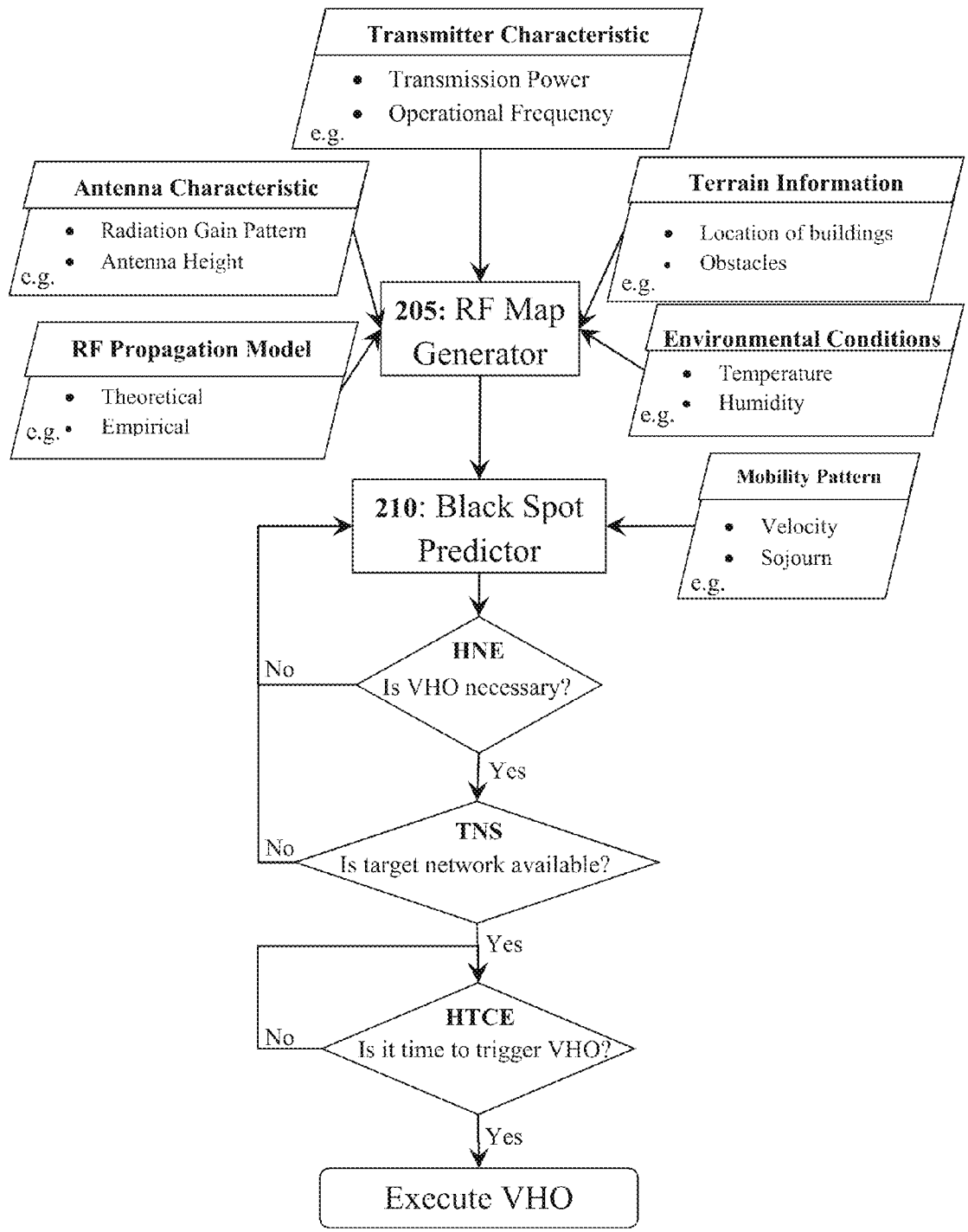
FIG. 2 illustrates a method flowchart of a RF map-aided VHO according to exemplary embodiments of the present disclosure.

FIG. 2 illustrates the method implemented by the RF map-aided VHO system 109 according to exemplary embodiments of the disclosed subject matter.

The RF Map Generator 205 may provide a RF coverage map, which includes information on a received signal strength (RSS) at any location in a coverage region for a point of attachment. For example, RF coverage map may provide information on RSS at any location in a covered region of point of attachment 103. The RF coverage map may be generated using the following network environment information:

a. Transmitter characteristics, such as transmission power and operational frequency, of a point of attachment;
  b. Antenna characteristics, such as radiation gain pattern and antenna height, of the point of attachment;
  c. RF propagation model (theoretical and/or empirical) of the point of attachment;
  d. Environmental conditions, such as temperature and humidity, within the coverage region of the point of attachment; and
  e. Terrain information, such as location of buildings and obstructions, within the coverage region of the point of attachment.

This network environment information is used to precisely determine the RSS at any point in the coverage region for a point of attachment. A plot of signal strength in the coverage region may be referred to as the RF map. The generated RF map along with the information about the mobility pattern of a mobile node may be used by the Black Spot Predictor 210 to predict an approaching black spot region. If the Black Spot Predictor 210 anticipates an approaching black spot region for the multi-interface mobile node 105, handover-related decisions may be made. These decisions may include: (i) Handover Necessity Estimation (HNE), e.g., evaluation of handover to an alternate access network; (ii) Target Network Selection (TNS), e.g., determination of alternate target network that can keep the communication intact as the multi-interface mobile node 105 traverses the black spot region 104 with respect to access network 102; and (iii) Handover Triggering Condition Estimation (HTCE), e.g., determination of the most appropriate instance for initiating a handover process to a selected target network, e.g., alternate access network 107.

Figure 3:
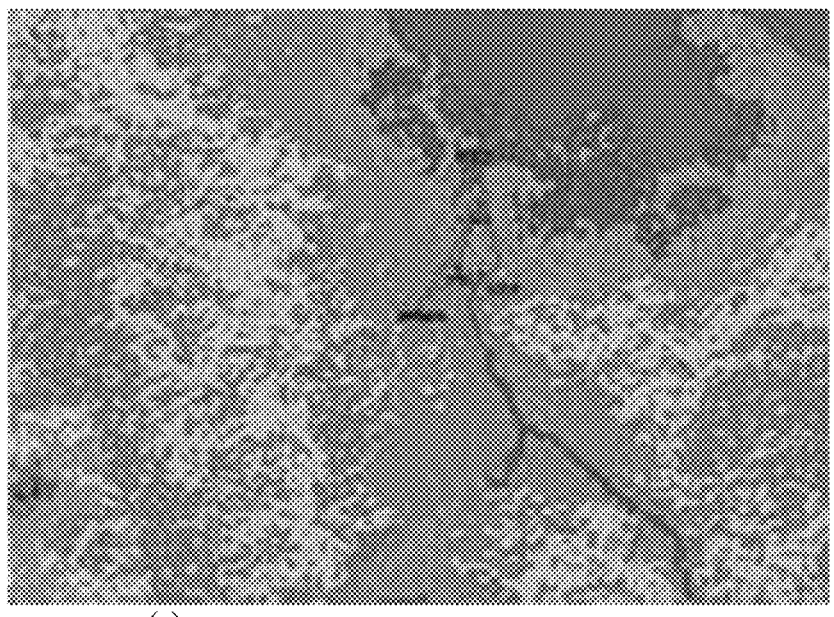
FIG. 3 depicts a terrain map and a RF coverage map corresponding to the terrain map according to exemplary embodiments of the present disclosure.
Figure 3:
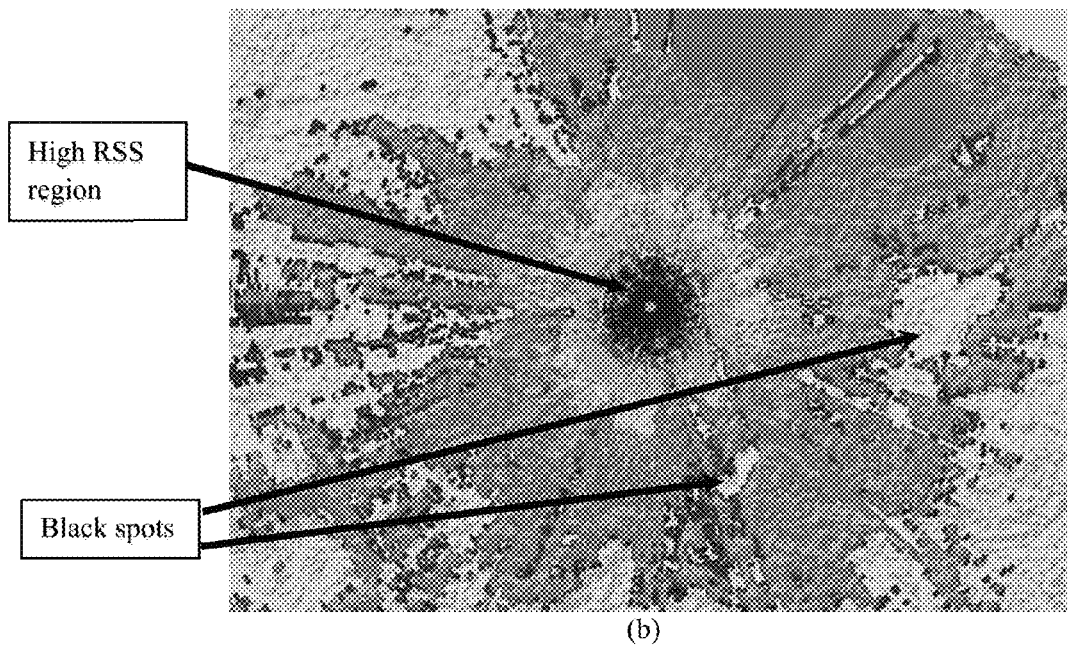

An example of a terrain map and an RF coverage map ((a) and (b) respectively in FIG. 3) corresponding to the terrain map is shown in FIG. 3. As indicated in the RF coverage map shown in FIG. 3 (*b*), the dark color indicates a highest signal strength region, whereas, a lightest colored region indicates a region where the signal strength is below a mobile node receiver's sensitivity level. Black spot regions are the regions within a coverage region of a point of attachment where the signal strength is below the receiver's sensitivity level (e.g., receiver signal strength threshold). These black spot regions (e.g., 104), when encountered by the multi-interface mobile node 105 without a black spot prediction mechanism, may result in a loss of communication by the multi-interface mobile node 105.

The Black Spot Predictor 210 may determine if the multi-interface mobile node 105 will encounter a black spot region 104 within a determined region and/or time period. The Black Spot Predictor 210 may use a RF map generated by RF map generator 205 along with the information about a current location of the multi-interface mobile node 105 and mobility pattern to predict an approaching black spot region 104 (as shown in FIG. 1.). To acquire the current location of the multi-interface mobile node 105, global positioning system (GPS) or various other suitable location determining systems can be used. The Black Spot Predictor 210 can keep track of the movements of the multi-interface mobile node 105 to determine the mobility pattern. If the black spot region 104 is detected in a projected path of the multi-interface mobile node 105, a trigger is generated when the multi-interface mobile node 105 arrives in the vicinity of the black spot region 104. The vicinity of the black spot 104 is determined by a predefined time threshold value, which may be determined by the time for performing a handover of a communication session or a call from the access network 102 to the alternate access network 107. The predefined time threshold value is equivalent to a time utilized for completing a handover from access network 102 (e.g., point of attachment 103) to alternate access network 107 (e.g., alternate point of attachment 108) before the multi-interface mobile node 105 enters the black spot region 104.

The projected path of the multi-interface mobile node 105 may be determined using various information, such as the location, velocity, and sojourn time of the multi-interface mobile node 105. Mobility models can help optimize handover-related decisions, which may include:

a. Handover Necessity Estimation (HNE): Estimation of whether a handover is needed, i.e. evaluation of cost of handover against benefit of handover. Cost may include the overhead due to handover process, call drop probability due to handover, etc., and the benefit may include a seamless maintenance of the ongoing call, etc. This would ensure that handovers with higher cost than benefit are avoided.
  b. Target Network Selection (TNS): Selection of an alternate access network from a list of access networks having coverage in a black spot region.
  c. Handover Triggering Condition Estimation (HTCE): Estimation and determination of a time for initiating handover execution. This is to maximize the connectivity with the access network 102.

According to exemplary embodiments of the disclosed subject matter, HNE is based on a cost of a handover against a benefit of the handover. Cost may include the overhead due to handover process, and a call drop probability due to handover, and the benefit may include a seamless maintenance of an ongoing call. A handover may also be considered unnecessary if a traversal time through the black spot region 104 is less than the interruption endurance of an application that the multi-interface mobile node 105 is using for communication.

The alternate access network 107 may be selected, via TNS mechanism, from a list of networks included in a candidate target network (CTN) list generated using the RF maps of diverse access networks in the heterogeneous network environment. More than one network in the CTN list may have RSS levels that are greater than or equal to a signal strength threshold level throughout the black spot region 104. However, in order to ensure that the multi-interface mobile node 105 is handed over to the best alternate access network 107, various network parameters may be considered in addition to RSS. These parameters may include available bandwidth, data rates, noise, interference, throughput, quality of service, security, and access cost. An access network from the CTN list that offers highest benefit is selected as the alternate access network 107.

The HTCE is used to determine an optimum instance for initiating the handover process. As the multi-interface mobile node 105 is handed over from the access network 102 to an alternate access network 107, it is desirable to extend the connectivity with the access network 102 by delaying the handover trigger. However, at the same time, handover to alternate access network 107 should be completed before the multi-interface mobile node 105 enters the black spot region 104. Handover triggering instant, which is generally related to the handover latency, may be the optimum instant for handover initiation.

Once, a determination to perform a handover is made and the alternate access network 107 is selected, the handover execution is triggered when the multi-interface mobile node 105 reaches a vicinity of the black spot region 104, which has been determined through HTCE.

In some cases, the handover triggering instant may occur before the multi-interface mobile node 105 enters the black spot region 104.

An end-to-end technique called host-based autonomous mobile address translation (HaMAT, illustrated in FIG. 4) may be used for handover execution. The multi-interface mobile node 105 may seek VHO support from the correspondent node 106 to maintain connectivity while the multi-interface mobile node 105 moves from access network 102 to the alternate access network 107. The multi-interface mobile node 105 may be responsible for handover-related messaging. This messaging may include a registration message indicating registration of the multi-interface mobile node 105 with the correspondent node 106 and an update message containing the updated address of the multi-interface mobile node 105 when the multi-interface mobile node 105 changes connectivity to another network.

Figure 4:
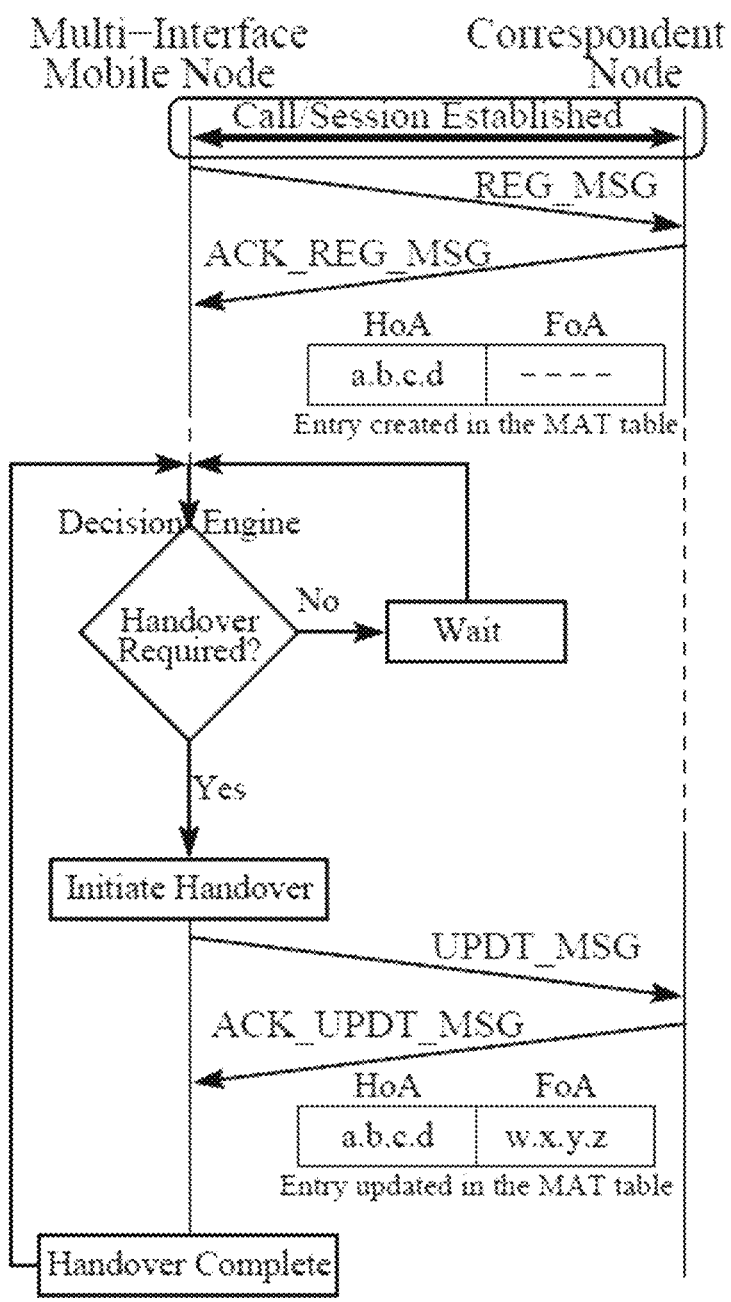
FIG. 4 illustrates the VHO execution process according to exemplary embodiments of the present disclosure.

FIG. 4. illustrates an exemplary handover procedure. A call or communication session may be established between the multi-interface mobile node 105 and the correspondent node 106. An address translation table maintained at both communication ends, i.e. multi-interface mobile node 105 and correspondent node 106, may be used during the handover. The multi-interface mobile node 105 may transmit a registration message (REG_MSG) to register the multi-interface mobile node 105 with the correspondent node 106 and an entry may be created in the address translation table, containing the address (Home Address (HoA)) of the multi-interface mobile node 105 used at the time a call to correspondent node 106 is initiated. The correspondent node 106 may transmit an acknowledgement message (ACK_REG_MSG) when the registration message is received from the multi-interface mobile node 105 and prior to performance of the HNE. When HNE estimates that a handover is necessitated, an update message (UPDT_MSG) is triggered at an instance estimated through HTCE to update the entry in the address translation table with information on the multi-interface mobile node 105's current location, i.e. the Foreign Address (FoA). The update message (UPDT_MSG) may be sent from the multi-interface mobile node 105 to the correspondent node 106. The correspondent node 106 may transmit an update acknowledgement message (ACK_UPDT_MSG) when the update message is received from the multi-interface mobile node 105 and after the HNE is performed. The correspondent node 106 may divert a packet for the multi-interface mobile node 105 directly to the updated location (i.e., FoA) of the mobile node 105, by translating a destination address of the packet corresponding to the HoA of the mobile node 105 according to the address translation table. At the multi-interface mobile node 105, the destination address of an incoming packet is translated back to the HoA, so that a connection established at a transport layer remains intact. The handover latency in this HaMAT method is dependent on a delay between the multi-interface mobile node 105 and the correspondent node 106, and is approximately equal to a round trip time (RTT) for packet transmission between the multi-interface mobile node 105 and the correspondent node 106. Since this HaMAT method does not require any modification or any additional component in the network infrastructure, this method is very suitable for testing the utility of RF coverage map for uninterrupted communication across black spots using VHO. The handover execution procedure as achieved through HaMAT scheme is illustrated in FIG. 4.

Accordingly, if the multi-interface mobile node 105 is in a call or communication session using access network 102, the call or communication session may be transferred to an alternate access network 107 to ensure that communication of the multi-interface mobile node 105 remains uninterrupted in, for example, a heterogeneous network environment where at least one network has coverage at any location.

The HaMAT is used an exemplary VHO scheme to describe the system and method for protecting a multi-interface mobile node 105 against loss of communication due to a black spot region 104.

Figure 5:
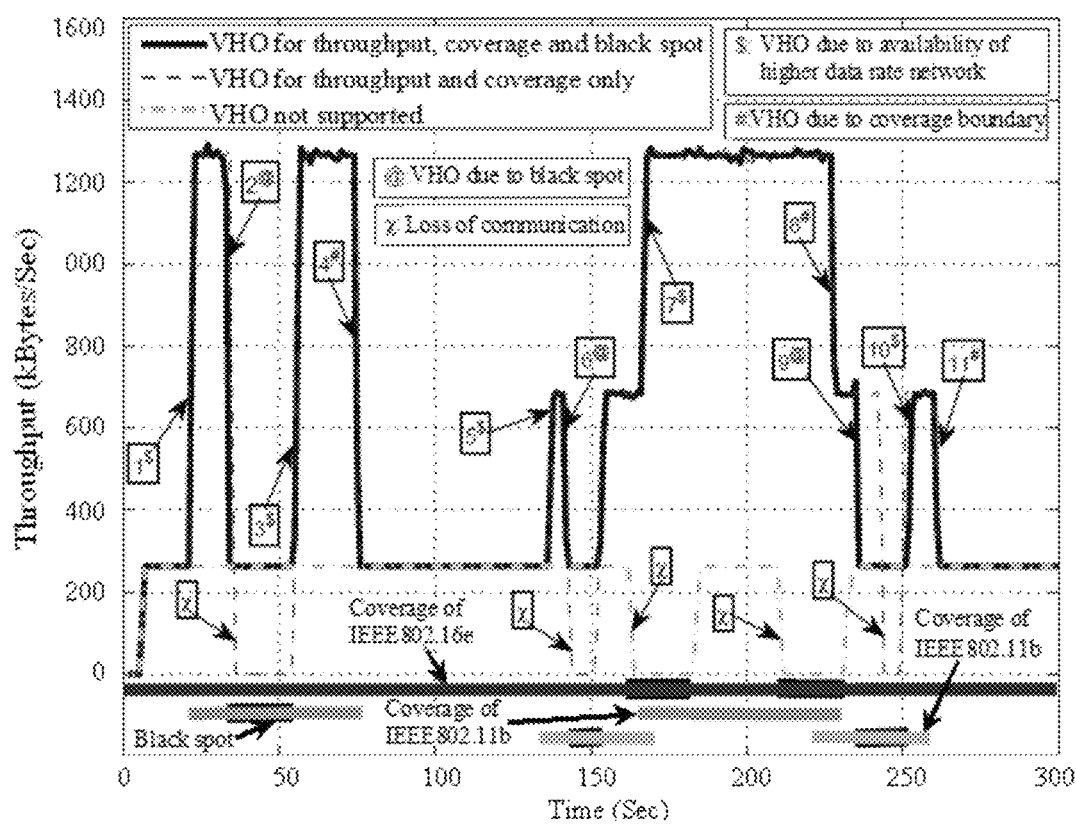
FIG. 5 illustrates a graph that shows data throughput for a mobile node when (i) no VHO support is utilized; (ii) VHO support is utilized; and (iii) VHO support with black spot prediction is utilized according to exemplary embodiments of the present disclosure.

FIG. 5 illustrates a graph that shows the data throughput for the multi-interface mobile node 105 when (i) no VHO support is utilized; (ii) VHO support is utilized; and (iii) VHO support with black spot prediction is utilized. In the first case, when no VHO support is utilized, the multi-interface mobile node 105 may use a WiMAX network for communication. Even when coverage areas of higher data rate networks are available, the multi-interface mobile node 105 does not perform a handover. As WiMAX black spots are encountered, the multi-interface mobile node 105's communication stops and throughput drops to 0. In the second case, when the multi-interface mobile node 105 utilizes VHO support, the mobile node 105 may connect to a network with a high throughput. However, when a black spot region is encountered, communication of the multi-interface mobile node 105 stops. In the third case, when the multi-interface mobile node 105 utilizes VHO support with black spot prediction, a black spot region may be predicted and handover may be performed to an alternative access network 107. The multi-interface mobile node 105 therefore may remain connected throughout a call session.

Exemplary embodiments of the disclosed subject matter provide a method and system for providing uninterrupted connectivity of a multi-interface mobile node. Black spots within a network can be traversed uninterrupted, provided there is at least one connectivity option available. A multi-interface mobile node may handover from one network to another network to maintain connectivity without losing any data packets.

The above-described exemplary embodiments of the present disclosure can be implemented in numerous ways. For example, the exemplary embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should also be appreciated that exemplary embodiments of the present disclosure are also directed to a computer-readable medium encoded with one or more programs including instructions that, when executed on one or more computers or other processors, perform methods that implement the various exemplary embodiments of the present disclosure. The computer-readable media may include, but are not limited to, non-transitory media, and volatile and non-volatile memory. The computer-readable media may include storage media, such as, for example, read-only memory (ROM), random access memory (RAM), floppy disk, hard disk, optical reading media (e.g., compact disc-read-only memory (CD-ROM), digital versatile discs (DVDs), hybrid magnetic optical disks, organic disks, flash memory drives or any other volatile or non-volatile memory, and other semiconductor media. The computer-readable storage media can store and execute computer-readable codes that may be distributed in computers connected via a network. The computer-readable media also includes cooperating or interconnected computer-readable media that are in a mobile node or are distributed among multiple processing systems that maybe local or remote to the mobile node. The computer readable medium or media can be transportable, such that the program or programs stored thereon can be loaded onto one or more different computers or other processors to implement various aspects of the present disclosure as discussed above.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A system, comprising:
a processor to:
provide, based on network environment information, a radio frequency (RF) map comprising (i) information on signal strength throughout a coverage region associated with a first point of attachment for a first network, and (ii) terrain information indicative of tactile signal obstacles within the coverage region associated with the first point of attachment for the first network;
predict, based on the RF map that includes (i) the information on signal strength throughout the coverage region associated with the first point of attachment, and (ii) the terrain information indicative of tactile signal obstacles within the coverage region, a black spot region for a first communication node connected to the first point of attachment for the first network; and
control a handover of a communication session of the first communication node from the first network to a second network based on the predicted black spot region,
wherein the communication session is between the first communication node and a second communication node, and the communication session of the first communication node is handed over from the first network to the second network while maintaining the communication session between the first communication node and the second communication node, and
wherein the black spot region comprises a region wherein a first receiver signal strength associated with the first point of attachment is lower than a signal strength threshold and a second receiver signal strength associated with a second point of attachment of the second network is greater than the signal strength threshold.

2. The system of claim 1, wherein:
the network environment information comprises at least one of transmitter characteristics of the first point of attachment, antenna characteristics of the first point of attachment, a RF propagation model of the first point of attachment, and environmental conditions and the terrain information in the coverage region associated with the first point of attachment.

3. The system of claim 1, wherein:
the first communication node comprises the processor.

4. The system of claim 1, further comprising:
a core network providing a connection between the first communication node and the second communication node.

5. A method, comprising:
providing, based on network environment information, a radio frequency (RF) map comprising (i) information on signal strength throughout a coverage region associated with a first point of attachment for a first network, and (ii) terrain information indicative of tactile signal obstacles within the coverage region associated with the first point of attachment for the first network;
predicting, based on the RF map that includes (i) the information on signal strength throughout the coverage region associated with the first point of attachment, and (ii) the terrain information indicative of tactile signal obstacles within the coverage region, a black spot region for a first communication node connected to the first point of attachment for the first network; and
performing a handover of a communication session of the first communication node from the first network to a second network based on the predicted black spot region,
wherein the communication session is between the first communication node and a second communication node, and the communication session of the first communication node is handed over from the first network to the second network while maintaining the communication session between the first communication node and the second communication node, and
wherein the black spot region comprises a region wherein a first receiver signal strength associated with the first point of attachment is lower than a signal strength threshold and a second receiver signal strength associated with a second point of attachment of the second network is greater than the signal strength threshold.

6. The method of claim 5, wherein the black spot region is predicted based on the RF map and information about a mobility pattern of the first communication node.

7. The method of claim 6, further comprising tracking movement of the first communication node to determine the mobility pattern of the first communication node.

8. The method of claim 5, wherein performing the handover comprises performing at least one of a handover necessity estimation, a target network selection, and a handover triggering condition estimation.

9. The method of claim 8, wherein performing the target network selection comprises selecting the second network from a plurality of candidate networks, the second network providing a connection for the communication session between the first communication node and the second communication node.

10. The method of claim 8, wherein performing the handover triggering condition estimation comprises determining a point of time to initiate the handover to the second network.

11. The method of claim 8, wherein performing the handover necessity estimation comprises determining a cost and a benefit of the handover.

12. The method of claim 5, wherein predicting the black spot region comprises determining whether the first communication node will encounter the black spot region within a determined geographical region or time period.

13. The method of claim 5, further comprising providing a trigger, wherein the trigger is provided when the first communication node enters a vicinity of the black spot region, the vicinity being determined by a time threshold value corresponding to a time for completing the handover of the communication session from the first network to the second network before the first communication node enters the black spot region.

14. The method of claim 13, wherein the trigger is provided when the black spot region is determined as being in a projected path of the first communication node, the projected path being determined using at least one of a location, velocity, and sojourn time of the first communication node.

15. The method of claim 5, wherein the network environment information comprises at least one of transmitter characteristics of the first point of attachment, antenna characteristics of the first point of attachment, a RF propagation model of the first point of attachment, and environmental conditions and the terrain information in the coverage region associated with the first point of attachment.

16. The method of claim 11, further comprising:

transmitting a registration message to the second communication node prior to performing the handover necessity estimation; and receiving an update acknowledgement message from the second communication node after performing the handover necessity estimation.

17. One or more non-transitory computer-readable storage media having stored thereon a computer program that, when executed by one or more processors, causes the one or more processors to perform acts comprising:

providing, based on network environment information, a radio frequency (RF) map comprising (i) information on signal strength throughout a coverage region associated with a first point of attachment for a first network, and (ii) terrain information indicative of tactile signal obstacles within the coverage region associated with the first point of attachment for the first network;

predicting, based on the RF map that includes (i) the information on signal strength throughout the coverage region associated with the first point of attachment, and (ii) the terrain information indicative of tactile signal obstacles within the coverage region, a black spot region for a first communication node connected to the first point of attachment for the first network; and performing a handover of a communication session of the first communication node from the first network to a second network based on the predicted black spot region, wherein the communication session is between the first communication node and a second communication node, and the communication session of the first communication node is handed over from the first network to the second network while maintaining the communication session between the first communication node and the second communication node, and wherein the black spot region comprises a region wherein a first receiver signal strength associated with the first point of attachment is lower than a signal strength threshold and a second receiver signal strength associated with a second point of attachment of the second network is greater than the signal strength threshold.

18. The one or more non-transitory computer-readable storage media of claim 17, wherein performing the handover comprises performing at least one of a handover necessity estimation, a target network selection, and a handover triggering condition estimation.

19. The method of claim 5, wherein the terrain information indicative of the tactile signal obstacles within the coverage region comprises information indicative of a location of at least one of a building or an obstruction.

* * * * *